United States Patent
Hsu et al.

(10) Patent No.: US 9,007,266 B2
(45) Date of Patent: *Apr. 14, 2015

(54) RECEIVING DEVICE FOR GLOBAL POSITIONING SYSTEM AND ANTENNA STRUCTURE THEREOF

(75) Inventors: Hsi-Hsing Hsu, Taoyuan (TW); Kai-Ta Wang, Taoyuan (TW); Chin-Lin Chang, Taoyuan (TW); Chuan-Ku Liu, Taoyuan (TW); Kuei-Chiang Huang, Taoyuan (TW); Kuo-Cheng Chen, Taoyuan (TW)

(73) Assignee: HTC Corporation, Taoyuan District, Taoyuan ( * ) Notice: Subject to any disclaimer, the term of this patent is extended or adjusted under 35 U.S.C. 154(b) by 55 days.

This patent is subject to a terminal disclaimer.

(21) Appl. No.: 13/603,363

(22) Filed: Sep. 4, 2012

(65) Prior Publication Data
US 2012/0326932 A1   Dec. 27, 2012

Related U.S. Application Data

(63) Continuation of application No. 12/176,483, filed on Jul. 21, 2008, now Pat. No. 8,289,215.

(30) Foreign Application Priority Data

Jul. 31, 2007  (TW) .............................. 96127852 A

(51) Int. Cl.
*H01Q 1/24* (2006.01)
*H01Q 9/04* (2006.01)
*G01S 19/36* (2010.01)

(52) U.S. Cl.
CPC ............... *G01S 19/36* (2013.01); *H01Q 1/243* (2013.01); *H01Q 9/0421* (2013.01)

(58) Field of Classification Search
USPC ................... 343/702, 825, 828, 846, 700 MS
See application file for complete search history.

(56) References Cited

U.S. PATENT DOCUMENTS 5,892,483 A   4/1999   Hayes et al.
5,986,607 A   11/1999   Rudisill
(Continued)

FOREIGN PATENT DOCUMENTS

TW   M279993   11/2005

OTHER PUBLICATIONS

Taiwanese language office action dated Sep. 26, 2012.
(Continued)

*Primary Examiner* — Michael C Wimer
(74) *Attorney, Agent, or Firm* — McClure, Qualey & Rodack, LLP

(57) ABSTRACT

A receiving device for a global positioning system and an antenna structure thereof. The receiving device includes a housing, a circuit board and the antenna structure. The circuit board is disposed inside the housing and has a ground portion and a signal feeding portion. The antenna structure is disposed inside the housing and includes a metal plate, a first electric conducting element and a second electric conducting element. The metal plate is used for receiving a GPS signal. The first electric conducting element has one end coupled to the metal plate, and the other end coupled to the ground portion of the circuit board. The second electric conducting element for feeding the GPS signal to the circuit board has one end coupled to the metal plate, and the other end coupled to the signal feeding portion of the circuit board.

25 Claims, 11 Drawing Sheets

(56) References Cited

U.S. PATENT DOCUMENTS

| | | |
|---|---|---|
| 6,215,671 B1 | 4/2001 | Kalis |
| 6,366,243 B1 * | 4/2002 | Isohatala et al. ....... 343/700 MS |
| 6,437,745 B1 * | 8/2002 | Vaisanen et al. ............. 343/702 |
| 6,469,673 B2 | 10/2002 | Kaiponen |
| 6,522,291 B1 | 2/2003 | Noguchi et al. |
| 6,573,869 B2 | 6/2003 | Moore |
| 6,650,294 B2 | 11/2003 | Ying et al. |
| 6,788,255 B2 | 9/2004 | Sakamoto et al. |
| 6,812,898 B2 | 11/2004 | Doub et al. |
| 6,856,287 B2 * | 2/2005 | Rao et al. ............... 343/700 MS |
| 6,903,695 B2 | 6/2005 | Sjoblom et al. |
| 7,256,742 B2 | 8/2007 | Chen et al. |
| 7,482,991 B2 * | 1/2009 | Boyle .......................... 343/767 |
| 7,504,998 B2 * | 3/2009 | Choi et al. ............. 343/700 MS |
| 7,629,928 B2 * | 12/2009 | Fabrega-Sanchez et al. .................... 343/700 MS |
| 2006/0142072 A1 | 6/2006 | Krenz et al. |

OTHER PUBLICATIONS

English language translation of abstract of TW M279993 (published Nov. 1, 2005).

* cited by examiner

RECEIVING DEVICE FOR GLOBAL POSITIONING SYSTEM AND ANTENNA STRUCTURE THEREOF

This is a Continuation of co-pending application Ser. No. 12/176,483, filed Jul. 21, 2008, which claims the benefit of Taiwan application Serial No. 96127852, filed Jul. 30, 2007, the subject matter of which is incorporated herein by reference.

BACKGROUND OF THE INVENTION

1. Field of the Invention

The invention relates to a receiving device for a global positioning system and an antenna structure thereof, and more particularly to a receiving device for a global positioning system, in which an antenna structure is hidden inside a housing, and the antenna structure thereof.

2. Description of the Related Art

In the modern age, in which the technology is changing with each passing day, various electronic devices bring many conveniences to human's life. More particularly, a receiving device for a global positioning system (GPS) receives a GPS signal transmitted from a satellite so that the user can know the traffic and geographic conditions through the receiving device.

FIG. 1A is an illustration showing a conventional receiving device 100 for a global positioning system. Referring to FIG. 1A, the receiving device 100 for the global positioning system includes a housing 110 and an antenna 120. The antenna 120 is a patch antenna. The antenna 120 has one end pivotally coupled to the housing 110, and the other end rotatable relative to the housing 110, as indicated by the arrow A. The antenna 120 has a ground plane, which significantly influences the signal receiving quality. In addition, when the user wants to use the receiving device 100 for the global positioning system, he or she has to turn or bend the antenna 120 to make the surface of the antenna 120 face the sky so that the antenna 120 can be used.

FIG. 1B is an illustration showing another conventional receiving device 200 for the global positioning system. Referring to FIG. 1B, the receiving device 200 for the global positioning system includes a housing 210 and an antenna 220. The antenna 220 is a monopole antenna. The antenna 220 projects out of the housing 210 to receive the GPS signal.

However, the antenna 120 of FIG. 1A and the antenna 220 of FIG. 1B are respectively exposed out of the housing 110 and the housing 210. Thus, the overall exterior is influenced and the antennas 120 and 220 tend to be damaged due to collision. In addition, the antenna 120 in use has to be turned and bent so that its surface faces the sky.

Furthermore, the conventional antennas 120 and 220 are disposed in an externally added manner, and spaces of the receiving devices for the global positioning systems have to be additionally provided to accommodate the antennas 120 and 220. In addition, the antennas 120 and 220 have the complicated structures and huge sizes, and the manufacturing cost is thus increased. Therefore, it is an important subject of the invention to overcome the above-mentioned problems.

SUMMARY OF THE INVENTION

The invention is directed to a receiving device for a global positioning system. The receiving device has an antenna structure hidden inside the housing thereof so that it can not only receive a GPS signal but also be carried conveniently and have a firm structure, a reduced size and a good signal receiving quality without influencing the overall exterior.

According to one aspect of the present invention, a receiving device for a global positioning system is provided. The receiving device includes a housing, a circuit board and an antenna structure. The circuit board is disposed inside the housing, and has a ground portion and a signal feeding portion. The antenna structure is disposed inside the housing. The antenna structure includes a metal plate, a first electric conducting element and a second electric conducting element. The metal plate is configured for receiving a GPS signal. The first electric conducting element has one end coupled to the metal plate, and the other end coupled to the ground portion of the circuit board. The second electric conducting element is configured for feeding the GPS signal to the circuit board and has one end coupled to the metal plate and the other end coupled to the signal feeding portion of the circuit board.

According to another aspect of the present invention, an antenna structure disposed inside a receiving device for a global positioning system (GPS) is provided. The receiving device for the global positioning system includes a housing and a circuit board. The circuit board has a ground portion and a signal feeding portion. The antenna structure is disposed inside the housing. The antenna structure includes a metal plate, a first electric conducting element and a second electric conducting element. The metal plate is configured for receiving a GPS signal. The first electric conducting element has one end coupled to the metal plate, and the other end coupled to the ground portion of the circuit board. The second electric conducting element is configured for feeding the GPS signal to the circuit board, and has one end coupled to the metal plate and the other end coupled to the signal feeding portion of the circuit board.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
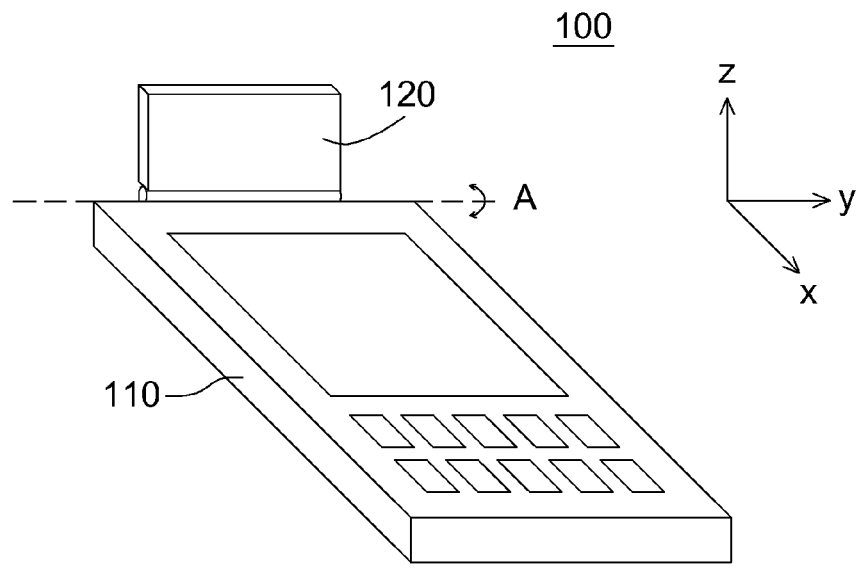
FIG. 1A is an illustration showing a conventional receiving device for a global positioning system.
Figure 1B:
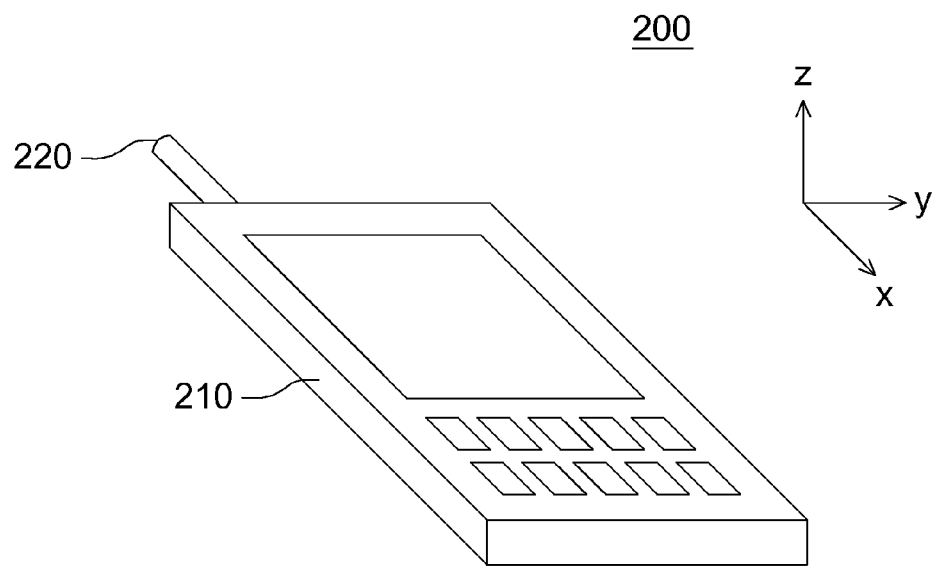
FIG. 1B is an illustration showing another conventional receiving device for the global positioning system.
Figure 2A:
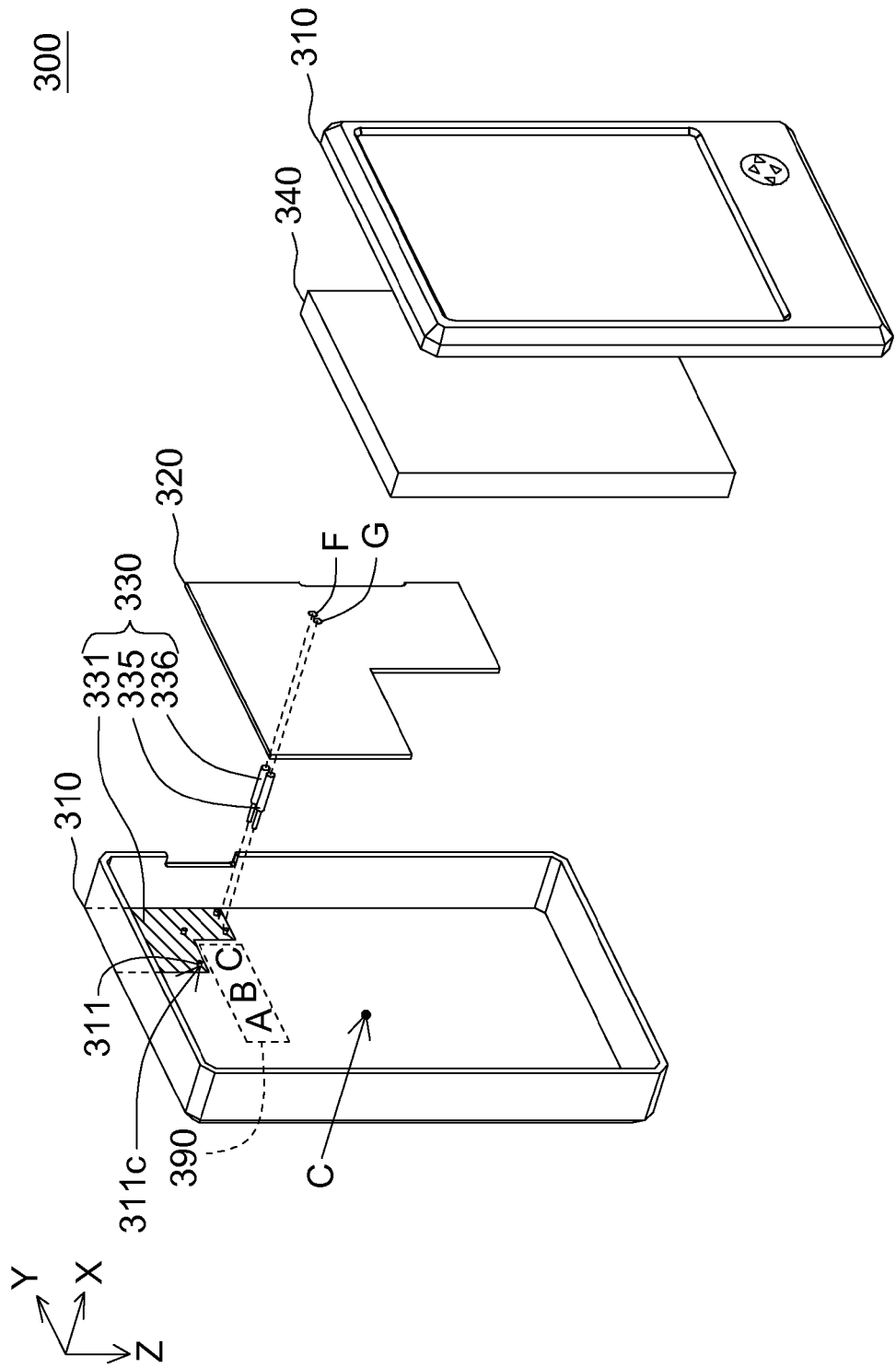
FIG. 2A is a schematically exploded view showing a receiving device for a global positioning system according to a first embodiment of the invention.

FIG. 2A is a schematically exploded view showing a receiving device 300 for a global positioning system according to a first embodiment of the invention. Referring to FIG. 2A, the receiving device 300 for the global positioning system includes a housing 310, a circuit board 320, an antenna structure 330 and a display 340. The circuit board 320 and the antenna structure 330 are disposed inside the housing 310. The display is exposed out of the housing 310 for displaying a data image. In this embodiment, the antenna structure 330 is a planar inverted F antenna (PIFA). The antenna structure 330 includes a metal plate 331, a first electric conducting element 335 and a second electric conducting element 336. The metal plate 331 is disposed on one side of the circuit board 320 for receiving a GPS signal transmitted from a satellite. The first electric conducting element 335 has one end coupled to the metal plate 331, and the other end coupled to a ground portion G of the circuit board 320. The second electric conducting element 336 is configured for feeding the GPS signal to the circuit board 320, and has one end coupled to the metal plate 331 and the other end coupled to a signal feeding portion F of the circuit board 320.

In this invention, the ground plane of the circuit board 320 serves as a ground of the antenna structure 330. However, the shape of the ground plane of the circuit board 320 does not have any great influence on the antenna structure 330 of the invention.

As shown in FIG. 2A, the first electric conducting element 335 and the second electric conducting element 336 are coupled to one corner of the metal plate 331. The first electric conducting element 335 and the second electric conducting element 336 are preferably disposed at the corner close to the center position C (pointed by the arrow) of the receiving device 300 for the global positioning system.

As shown in FIG. 2A, the first electric conducting element 335 and the second electric conducting element 336 are pogo pins. A distal end of the pogo pin is fixed to the circuit board 320, and a copper ball on a tip end of the pogo pin may tightly press against the metal plate 331 through a spring inside the pogo pin.

In order to avoid the interferences from other electrical elements or metal elements, the metal plate 331 may be distant from other electrical elements or metal elements according to the actual conditions. As show in FIG. 2A, the metal plate 331 of this embodiment is configured to have an L-shaped structure to be distant from a metal mark 390 on an external side surface of the housing 310.

The metal plate 331 is disposed on an inner side surface of the housing 310. The metal plate 331 only has to be disposed inside a redundant and available space in the existing space without changing the original spatial design.

In addition, the metal plate 331 has a positioning hole 331c, and the housing 310 has a positioning pin 311. The positioning pin 311 is inserted into the positioning hole 331c to fix the metal plate 331 to the inner side surface of the housing 310. Preferably, the metal plate 331 is a phosphor bronze metal sheet, and a gold film is coated on a surface of the metal plate 331 to prevent the metal plate 331 from being oxidized and to facilitate the signal transmission.

Figure 2C:
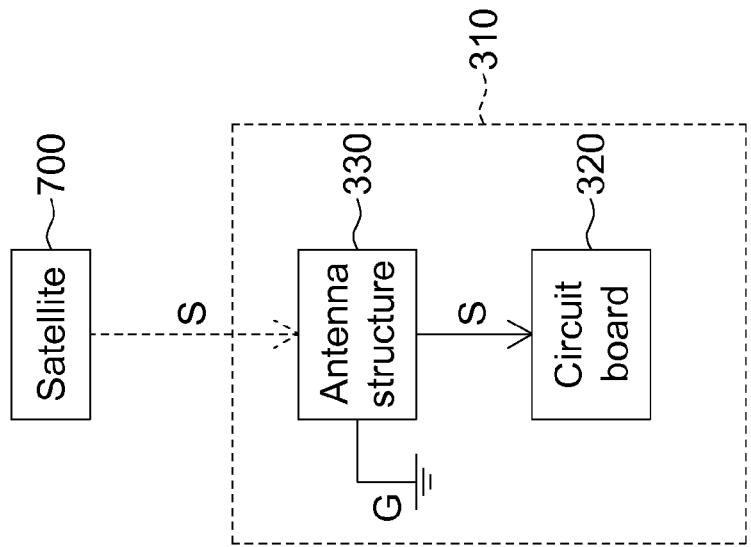
FIG. 2C is a block diagram showing the receiving device for the global positioning system.
Figure 2B:
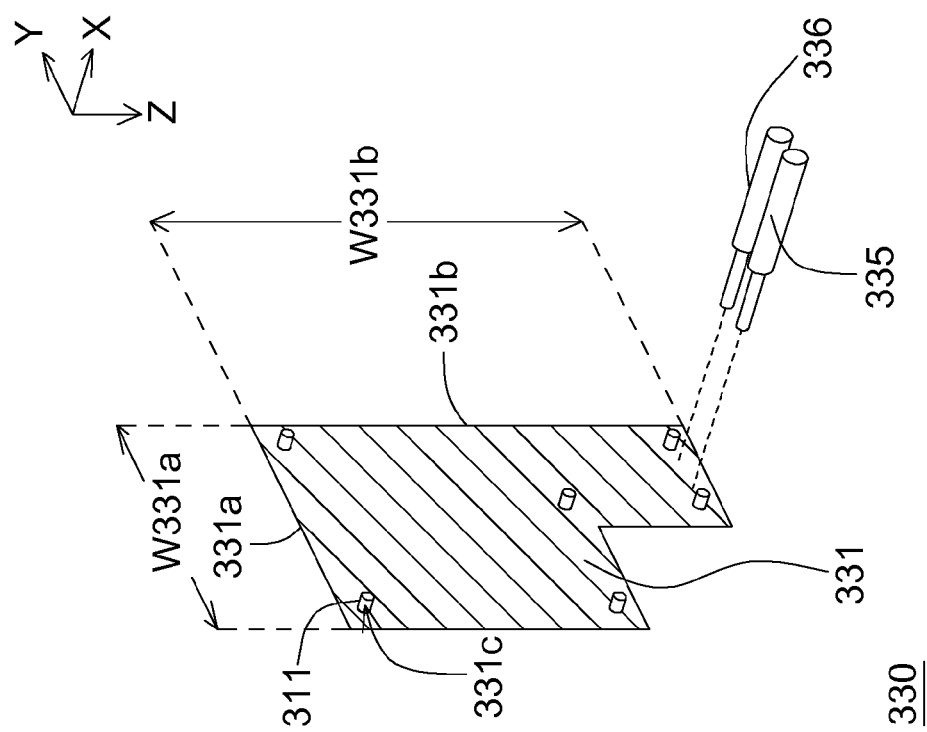
FIG. 2B is an illustration showing an antenna structure of FIG. 2A.

FIG. 2B is an illustration showing the antenna structure of FIG. 2A. Referring to FIG. 2B, the metal plate 331 has a first lateral side 331a and a second lateral side 331b, which are adjacent to each other and form an external side edge of the metal plate 331. The sum of the length W331a of the first lateral side 331a and the length W331b of the second lateral side 331b is substantially equal to one fourth of the wavelength of the GPS signal so that the GPS signal can be received. In this embodiment, the frequency of the GPS signal is about 1575.42 MHz. The length W331a of the first lateral side 331a and the length W331b of the second lateral side 331b of the metal plate 331 may be adjusted according to the frequency of the GPS signal so that the GPS signal can be correctly received.

FIG. 2C is a block diagram showing the receiving device for the global positioning system. Referring to FIGS. 2B and 2C, a satellite 700 outputs a GPS signal S to the antenna structure 330, the GPS signal S is transmitted to the circuit board 320 through the second electric conducting element 336, and the antenna structure 330 is coupled to the ground portion G through the first electric conducting element 335.

Figure 2D:
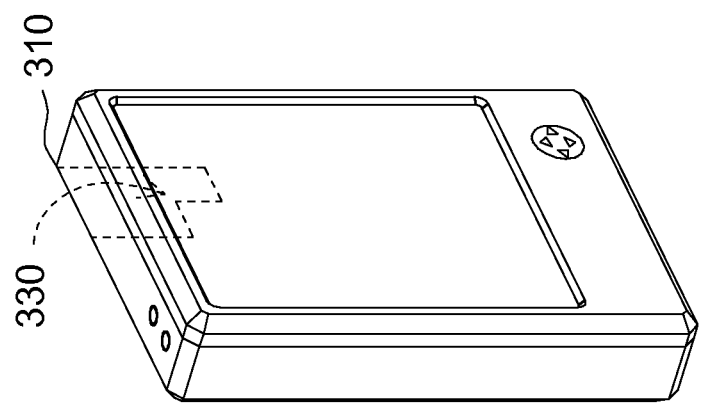
FIG. 2D is a schematically assembled view showing the receiving device for the global positioning system of FIG. 2A.
Figure 2D:
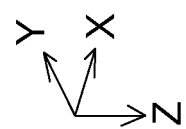

FIG. 2D is a schematically assembled view showing the receiving device for the global positioning system of FIG. 2A. As shown in FIG. 2D, the antenna structure 330 is hidden inside the housing 310 after the housing 310 is assembled. Thus, the exterior of the receiving device 300 for the global positioning system can be kept complete, and it is possible to prevent the antenna structure 330 from being damaged by collision.

Figure 3A:
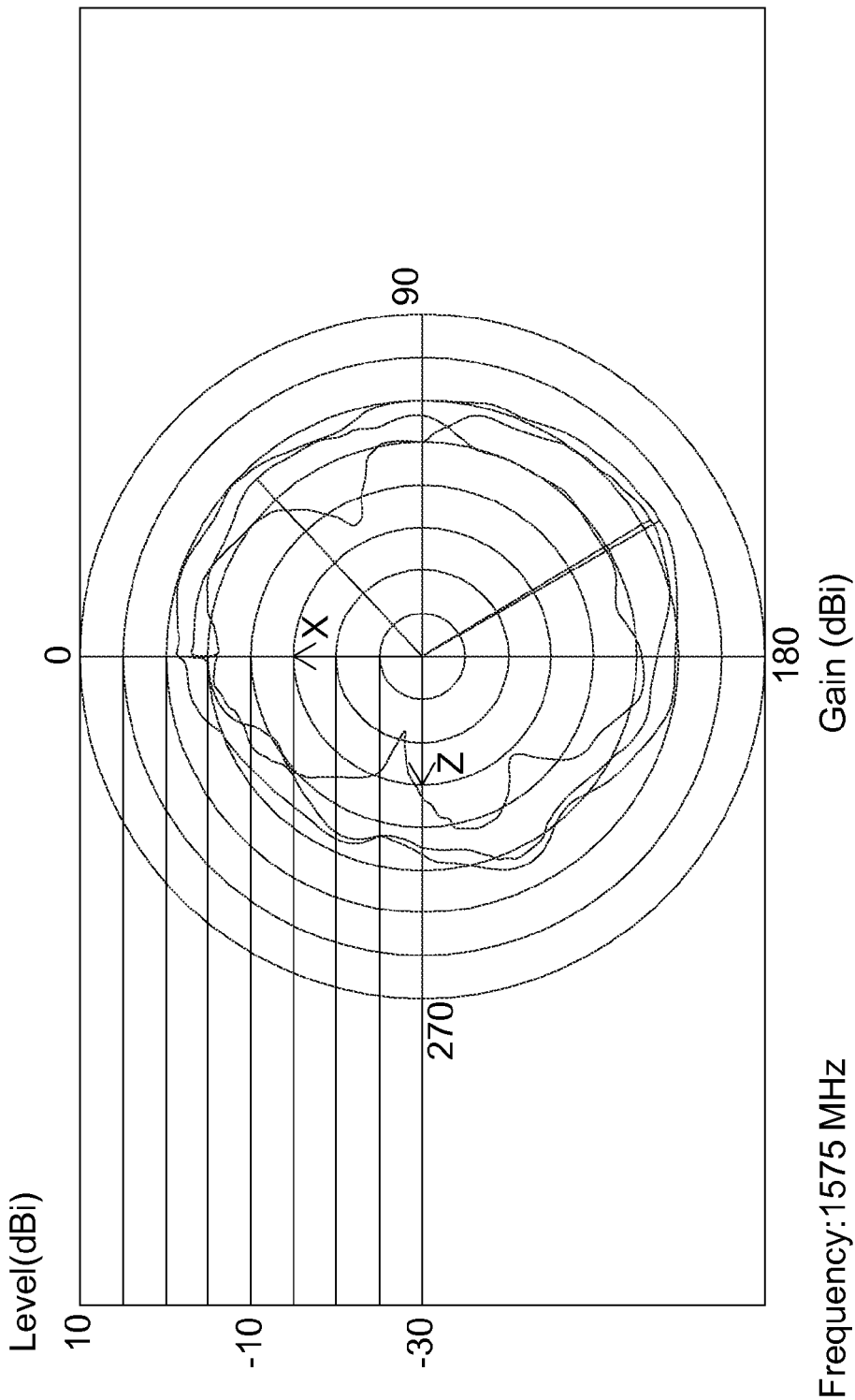
FIG. 3A shows a radiation pattern of the receiving device of FIG. 2D in the X-Z plane.
Figure 3B:
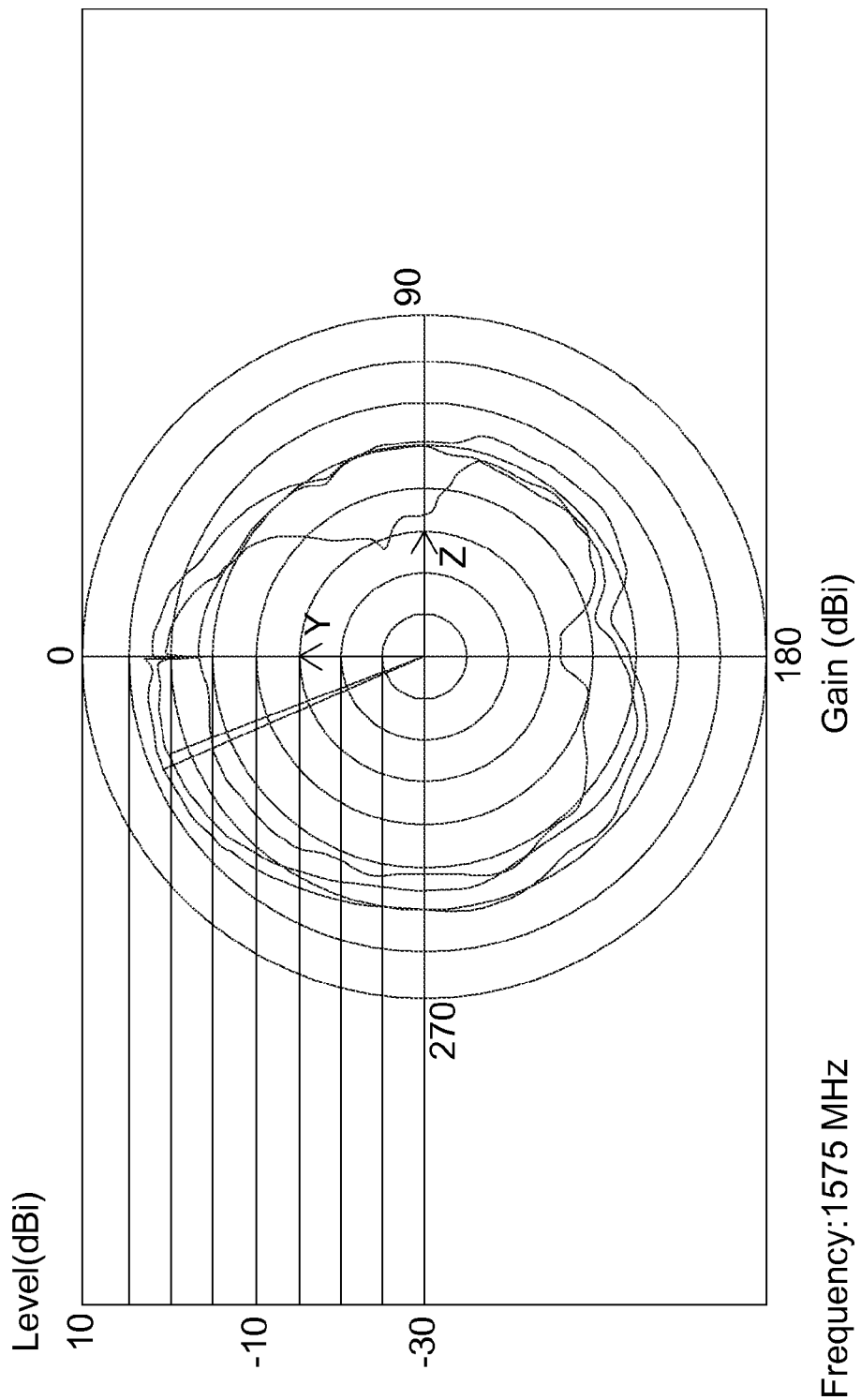
FIG. 3B shows a radiation pattern of the receiving device of FIG. 2D in the Y-Z plane.
Figure 3C:
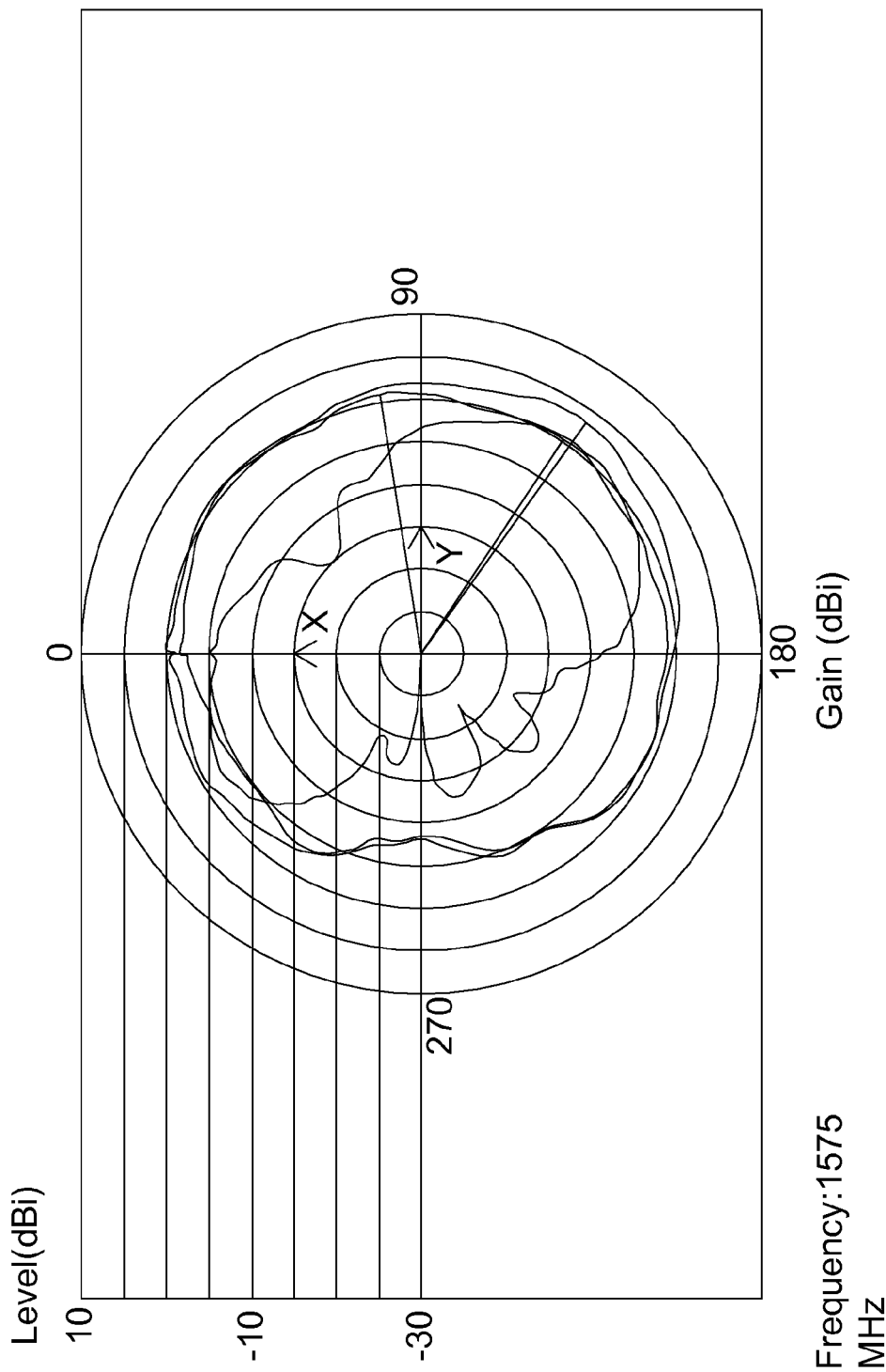
FIG. 3C shows a radiation pattern of the receiving device of FIG. 2D in the X-Y plane.

FIG. 3A shows a radiation pattern of the receiving device of FIG. 2D in the X-Z plane. FIG. 3B shows a radiation pattern of the receiving device of FIG. 2D in the Y-Z plane. FIG. 3C shows a radiation pattern of the receiving device of FIG. 2D in the X-Y plane. Referring to FIGS. 3A to 3C and 2D, the receiving device 300 for the global positioning system receives the GPS signal through the antenna structure 330 and the radiation patterns in various directions are measured with the frequency of 1575 MHz. The hidden antenna structure 330 of this embodiment has the gain ranging from about −10 dBi to 5 dBi in each direction, and has the pattern similar to a circular shape so that the antenna structure is adapted to the receiving of the GPS signal. According to the measured result, the antenna structure 330 in the receiving device for the global positioning system according to this embodiment can obtain an excellent signal receiving quality at various angles.

Second Embodiment

Figure 4A:
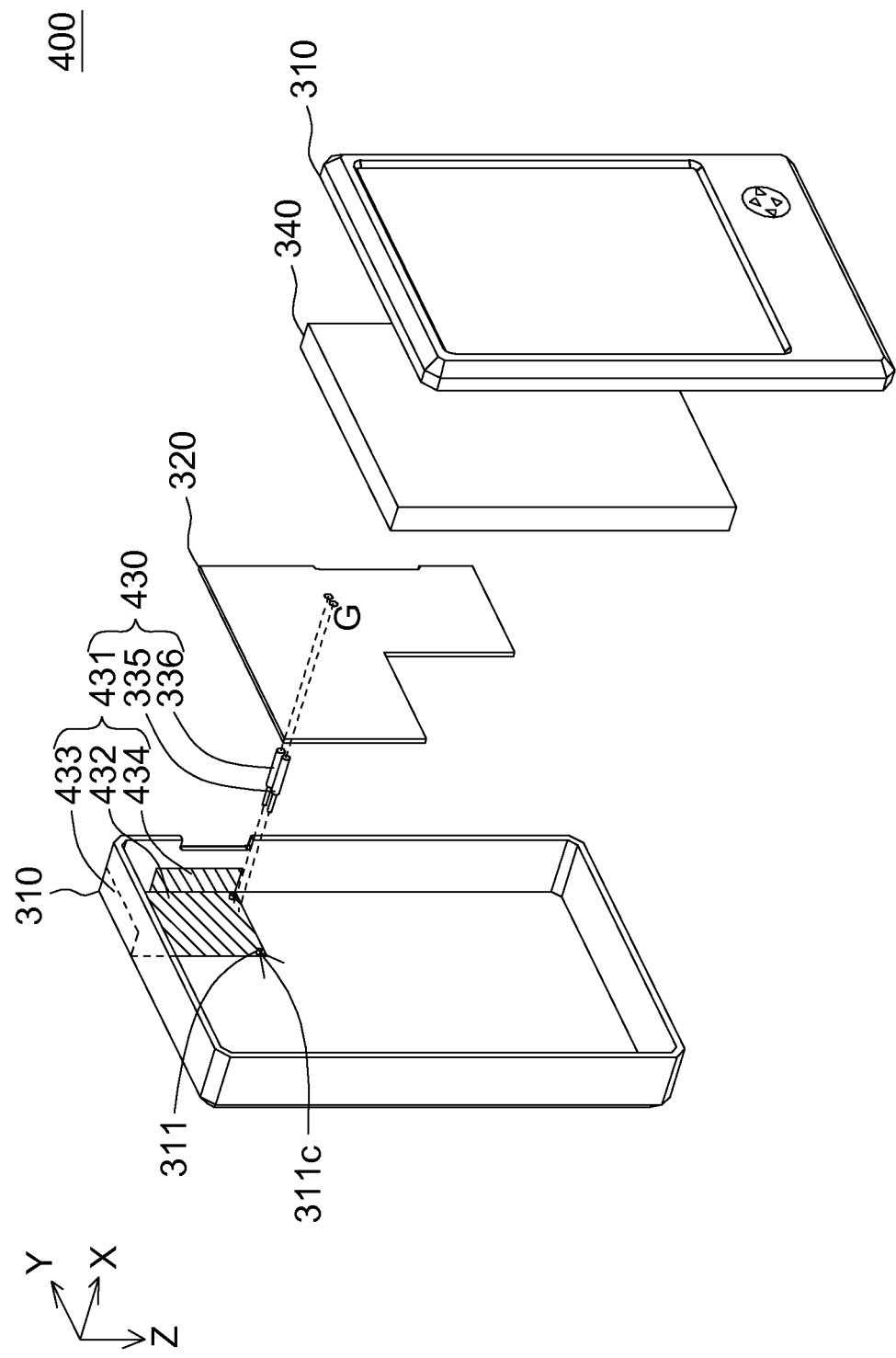
FIG. 4A is a schematically exploded view showing a receiving device for a global positioning system according to a second embodiment of the invention.
Figure 4B:
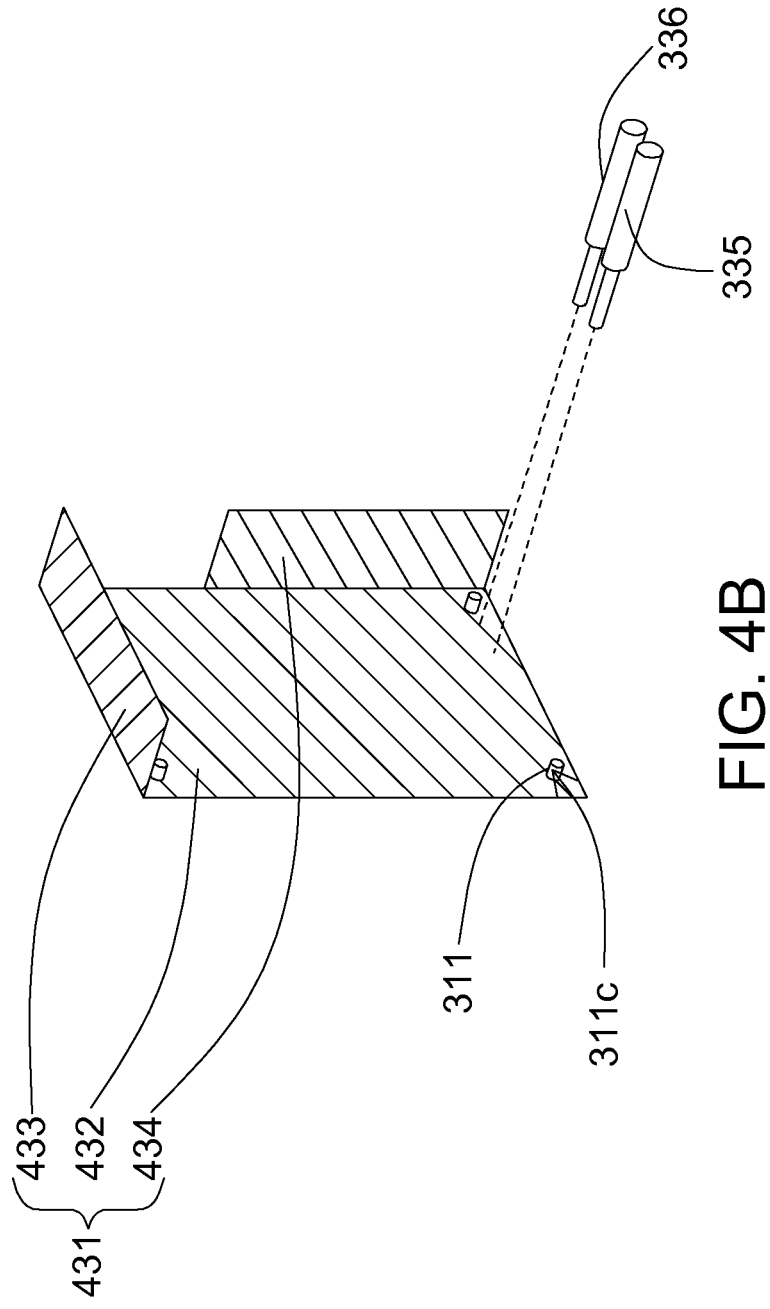
FIG. 4B is an illustration showing an antenna structure of FIG. 4A.

FIG. 4A is a schematically exploded view showing a receiving device 400 for a global positioning system according to a second embodiment of the invention. FIG. 4B is an illustration showing an antenna structure 430 of FIG. 4A. As shown in FIGS. 4A and 4B, the difference between the receiving device 400 according to this embodiment and the receiving device 300 according to the first embodiment resides in the antenna structure 430, and other elements similar to those of the first embodiment are indicated by the same symbols in FIG. 2A so that detailed descriptions for other elements in this embodiment will be omitted.

As shown in FIG. 4A, the antenna structure 430 includes a metal plate 431, a first electric conducting element 335 and a second electric conducting element 336. The metal plate 431 includes a main body plate 432, a first extension plate 433 and a second extension plate 434. One end of the first electric conducting element 335 and one end of the second electric conducting element 336 are coupled to the main body plate 432. The first extension plate 433 is bent on one side of the main body plate 432 and disposed adjacent to a top end of a housing 310. A normal of the first extension plate 433 is substantially perpendicular to a normal of the main body plate 432. The second extension plate 434 is bent on the other side of the main body plate 432 and disposed adjacent to a side end of the housing 310. A normal of the second extension plate 434 is substantially perpendicular to the normal of the main body plate 432.

Third Embodiment

Figure 5A:
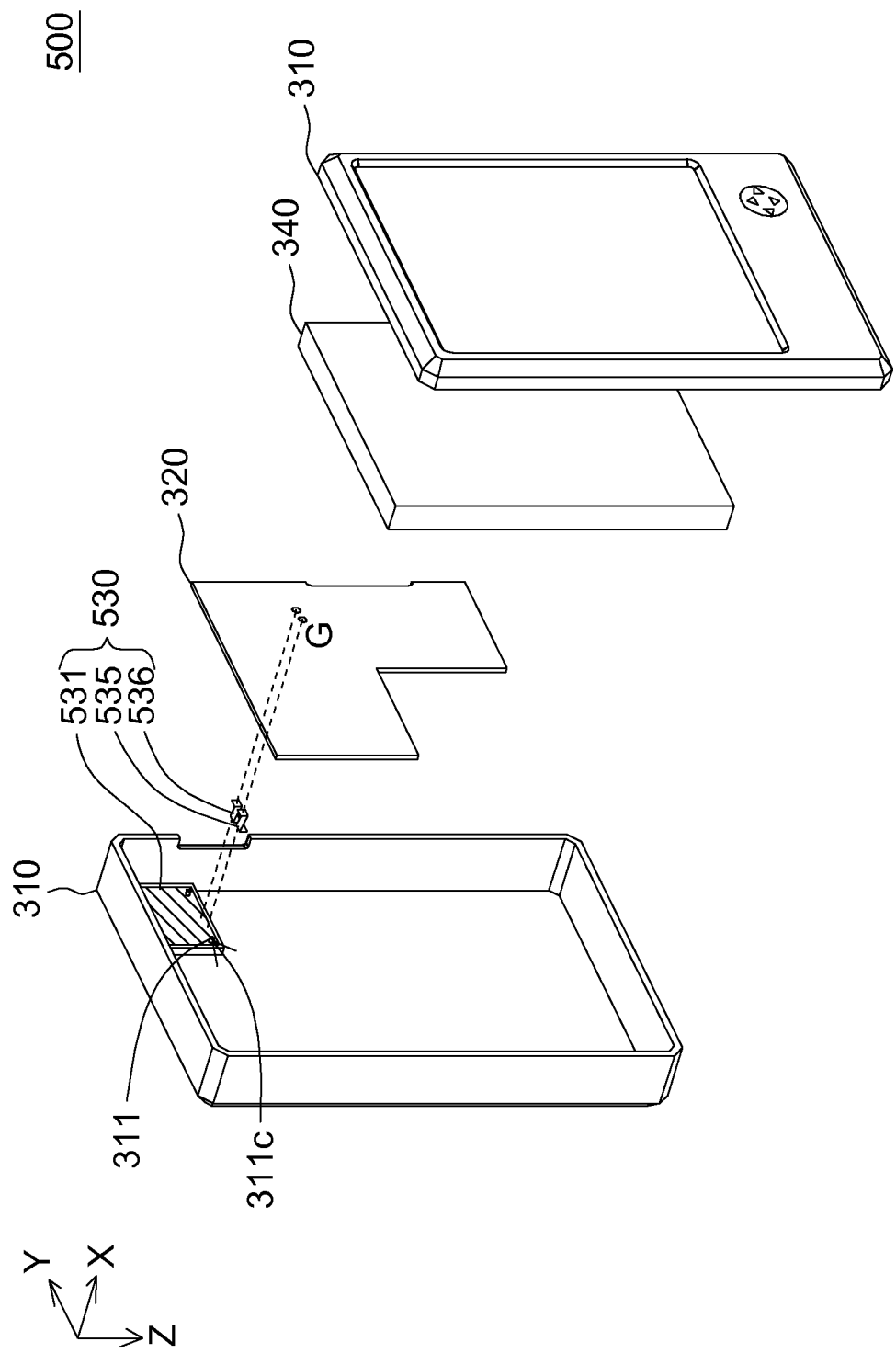
FIG. 5A is a schematically exploded view showing a receiving device for a global positioning system according to a third embodiment of the invention.
Figure 5B:
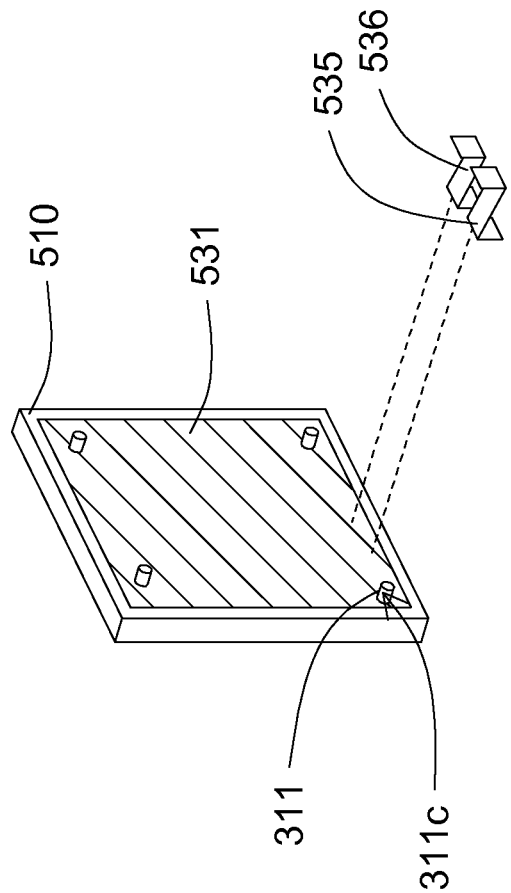
FIG. 5B is an illustration showing an antenna structure of FIG. 5A.

FIG. 5A is a schematically exploded view showing a receiving device 500 for a global positioning system according to a third embodiment of the invention. FIG. 5B is an illustration showing an antenna structure 530 of FIG. 5A. As shown in FIGS. 5A and 5B, the difference between the receiving device 500 according to this embodiment and the receiving device 300 according to the first embodiment resides in the antenna structure 530, and the other elements similar to those of the first embodiment are indicated by the same symbols in FIG. 2A so that detailed descriptions for other elements in this embodiment thereof will be omitted.

Referring to FIG. 5A, the antenna structure 530 includes a metal plate 531, a first electric conducting element 535 and a second electric conducting element 536. The metal plate 531 has a rectangular structure and is supported on a supporting member 510 disposed on a housing 310. The supporting member 510 may be made of any material, which cannot influence the GPS signal receiving ability of the antenna structure 530. Preferably, the supporting member 510 is made of a plastic material. The supporting member 510 for supporting the metal plate 531 can further prevent other elements from contacting the metal plate 531 and thus influencing the function thereof.

In addition, the first electric conducting element 535 and the second electric conducting element 536 may be implemented by elastic metal sheets, which may also achieve the function of electrical connection and can be easily bonded to the circuit board 320.

According to the three embodiments mentioned hereinabove, the illustrated metal plate of the invention has the L-shaped structure or the rectangular structure. However, the shape of the metal plate may also be adjusted according to the measured result in this invention. Any modification cannot depart from the scope of the invention as long as a PIFA antenna structure is disposed inside the housing to achieve the object of receiving the GPS signal.

According to the three embodiments mentioned hereinabove, the first electric conducting element and the second electric conducting element illustrated in this invention are pogo pins. However, the first electric conducting element and the second electric conducting element may also be metal probes or metal screws. Any modification cannot depart from the scope of the invention as long as electric connectors are provided to serve as the first electric conducting element and the second electric conducting element so that the metal plate is electrically connected to the ground portion of the circuit board and the signal feeding portion of the circuit board.

In the receiving device for the global positioning system and the antenna structure thereof according to each embodiment of the invention, the antenna structure is hidden inside the housing to achieve the object of receiving the GPS signal. Accordingly, the following advantages can be obtained.

First, the conventional patch antenna only can receive the GPS signal at some angles. The first and second electric conducting elements of the antenna structure of each embodiment are disposed at the corner of the metal plate so that the radiation pattern of the antenna structure approaches the circular shape and the antenna structure can receive the GPS signal at the angle wider than that of the conventional antenna structure. Of course, the first electrical connector and the second electrical connector may further be adjusted so that the radiation pattern is concentrated to the top, and the GPS signal receiving ability can be enhanced.

Second, the conventional antenna to be used has to be turned and bent so that its surface faces the sky. However, the antenna structure can be used without the need of adjusting the angle of the antenna structure. Thus, it is very convenient to the user who wants to use the antenna structure.

Third, the designed quality of the ground plane of the conventional antenna greatly influences the signal receiving quality of the antenna. The ground plane of the circuit board is used as the ground plane of the antenna structure in this invention, and the shape of the ground plane of the circuit board does not have the significant influence on the antenna structure of the invention.

Fourth, the conventional antenna is disposed in an externally added manner, so the space has to be provided to accommodate the antenna. In this invention, however, the antenna structure only has to be integrated into the redundant and available space in the existing space without changing the originally spatial design. Thus, the product of the invention may be designed more easily.

Fifth, the antenna structure of the invention is hidden inside the housing. Thus, the overall exterior cannot be influenced and the antenna structure of the invention cannot be easily damaged.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable receiving device for a global positioning system (GPS), comprising:
 a housing;
 a circuit board disposed inside the housing, the circuit board having a ground portion and a signal feeding portion; and
 an antenna comprising:
 a metal plate for receiving a GPS signal, wherein the metal plate has a first lateral side, a second lateral side and a third lateral side, the second lateral side is connected to the first lateral side and the third lateral side, the first lateral side and the third lateral side are substantially parallel with each other, and a first distance between the third lateral side and a center of the portable receiving device is smaller than a second distance between the first lateral side and the center of the portable receiving device;
 a first electric conducting element coupled to the ground portion of the circuit board; and
 a second electric conducting element coupled to the signal feeding portion of the circuit board for feeding the GPS signal to the circuit board;
 wherein the first electric conducting element and the second electric conducting element are respectively connected to two contact points of the metal plate, the two contact points are positioned along a line substantially parallel to the first lateral side, and a third distance between the contact points and the third lateral side is smaller than a fourth distance between the contact points and the first lateral side.

2. The device according to claim 1, wherein the metal plate is disposed inside the housing.

3. The device according to claim 1, wherein the metal plate is fixed to a surface of the housing.

4. The device according to claim 1, wherein the metal plate is disposed on an inner side surface of the housing.

5. The device according to claim 1, wherein the metal plate is supported on a supporting member disposed on the housing.

6. The device according to claim 5, wherein the supporting member is made of a plastic material.

7. The device according to claim 1, wherein a length of an external side edge of the metal plate is substantially equal to one fourth of a wavelength of the GPS signal.

8. The device according to claim 1, wherein a sum of the lengths of the first lateral side and the second lateral side is substantially equal to one fourth of a wavelength of the GPS signal.

9. The device according to claim 1, wherein the antenna is a planar inverted F antenna.

10. The device according to claim 1, wherein a ground of the circuit board is used for grounding the antenna.

11. The device according to claim 1, wherein the metal plate includes a main body plate, a first extension plate and a second extension plate, and the first extension plate is bent on a first edge of the main body plate while the second extension plate is bent on a second edge of the main body plate.

12. The device according to claim 11, wherein the first extension plate is disposed adjacent to a top end of the housing while the second extension plate is disposed adjacent to a side end of the housing.

13. The device according to claim 11, wherein the length of an edge of the first extension plate connecting the main body plate is equal to that of the main body plate.

14. The device according to claim 11, wherein the length of an edge of the second extension plate connecting the main body plate is smaller than that of the main body plate.

15. The device according to claim 1, wherein the first electric conducting element and the second electric conducting element are elastic metal sheets.

16. The device according to claim 1, wherein the first electric conducting element and the second electric conducting element are pogo pins.

17. The device according to claim 1, further comprising:
a supporting member disposed inside the housing for supporting the metal plate.

18. The device according to claim 1, wherein the metal plate is an L-shaped structure.

19. The device according to claim 1, further comprising a display exposed out of the housing for displaying a data image.

20. The device according to claim 1, wherein the antenna is located adjacent to an end of the housing.

21. The device according to claim 1, wherein the first electric conducting element and the second electric conducting element are connected to a region close to a corner of the metal plate which is close to the center of the portable receiving device.

22. The device according to claim 1, wherein the housing has a first surface, at least one positioning pin, a second surface and a third surface perpendicular to the first and second surfaces, the second surface is perpendicular to the first surface, and the metal plate comprises:
a main body plate disposed on the first surface, wherein the main body plate has a first edge and a second edge;
a first extension plate bent on the first edge of the main body plate and disposed on the second surface; and
a second extension plate bent on the second edge of the main body plate and disposed on the third surface, wherein the length of the first extension plate along the first edge is equal to that of the main body plate, and the length of the second extension plate along the second edge is smaller than that of the main body plate.

23. The device according to claim 22, wherein the metal plate is disposed on the first surface of the housing, the metal plate has at least one positioning hole, the positioning pin of the housing is inserted into the positioning hole for fixing the metal plate.

24. The device according to claim 22, wherein the first electric conducting element has a first end pressed against the metal plate of the antenna and a second end fixed to the ground portion of the circuit board, and the second electric conducting element has a third end pressed against the metal plate of the antenna and a fourth end fixed to the signal feeding portion of the circuit board.

25. A portable receiving device for a global positioning system (GPS), comprising:
a housing;
a circuit board disposed inside the housing, the circuit board having a ground portion and a signal feeding portion; and
an antenna comprising:
a metal plate for receiving a GPS signal;
a first electric conducting element coupled to the ground portion of the circuit board; and
a second electric conducting element coupled to the signal feeding portion of the circuit board for feeding the GPS signal to the circuit board;
wherein the first electric conducting element and the second electric conducting element are respectively connected to two contact points of the metal plate, the metal plate has a first lateral side, a second lateral side and a third lateral side, the second lateral side is connected to the first lateral side and the third lateral side, the first lateral side and the third lateral side are substantially parallel with each other, the two contact points are positioned along a line substantially parallel to the first lateral side of the metal plate, the metal plate is a wholly flat plate and a sum of the lengths of the first lateral side and the second lateral side is substantially equal to one fourth of a wavelength of the GPS signal.

* * * * *